No. 726,513. PATENTED APR. 28, 1903.
J. DANNER.
PLANT FOR DISPOSAL OF SEWAGE.
APPLICATION FILED AUG. 13, 1902.
NO MODEL. 2 SHEETS—SHEET 2.
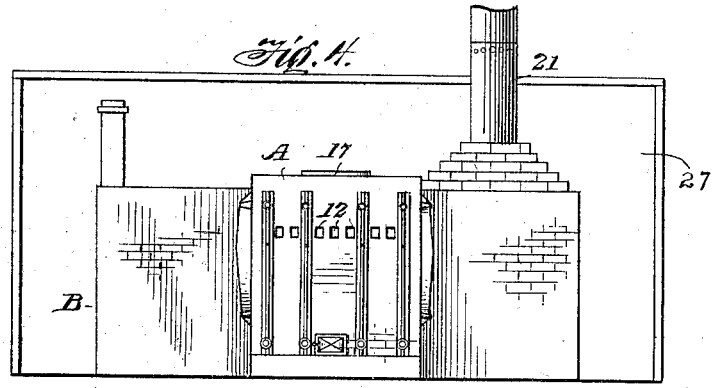
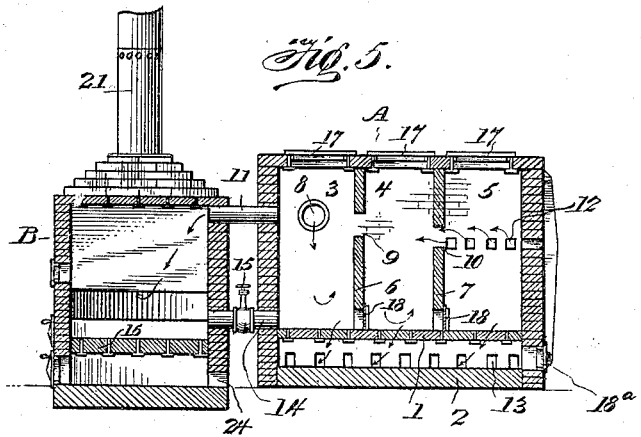
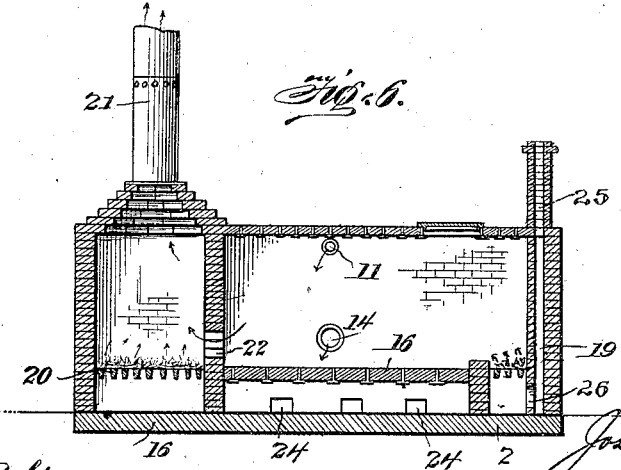

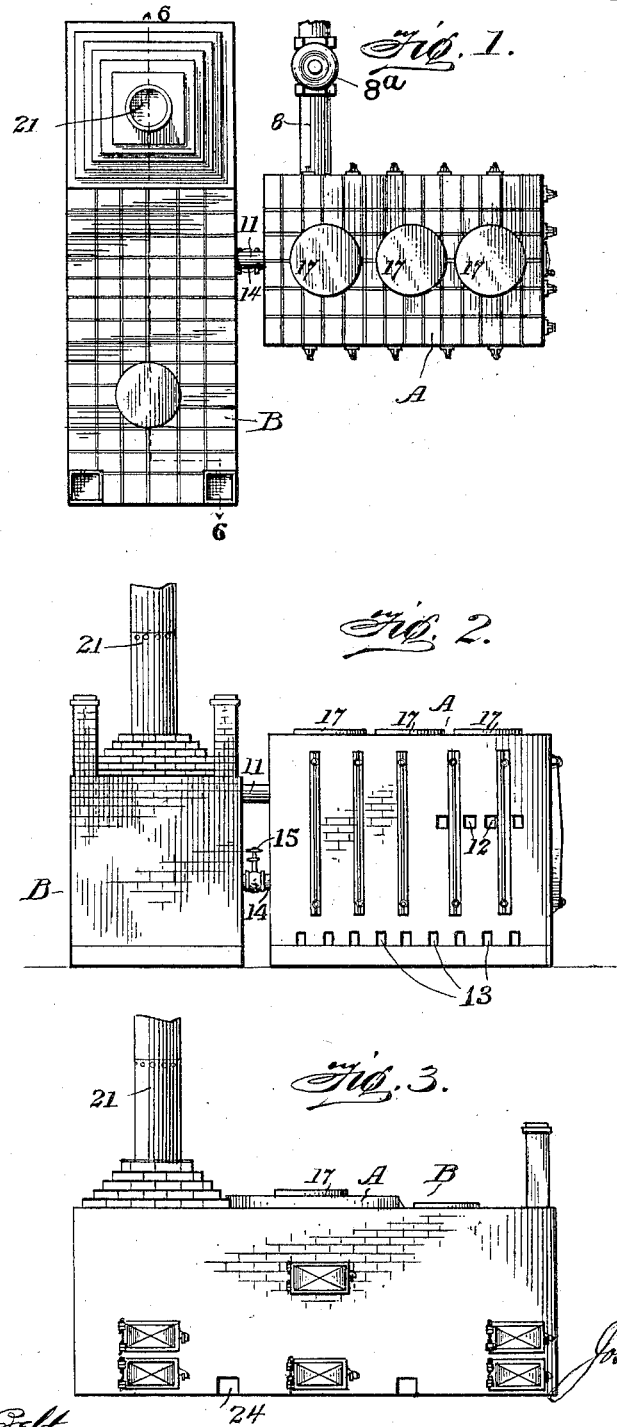

UNITED STATES PATENT OFFICE.

JOSEPH DANNER, OF SCRANTON, PENNSYLVANIA, ASSIGNOR OF TWO-THIRDS TO JAMES J. CROGHAN AND ALFRED TURNER, OF SCRANTON, PENNSYLVANIA.

PLANT FOR DISPOSAL OF SEWAGE.

SPECIFICATION forming part of Letters Patent No. 726,513, dated April 28, 1903.

Application filed August 13, 1902. Serial No. 119,559. (No model.)

*To all whom it may concern:*

Be it known that I, JOSEPH DANNER, a citizen of the United States, residing at Scranton, in the county of Lackawanna, State of Pennsylvania, have invented certain new and useful Improvements in Plants for Disposal of Sewage, of which the following is a specification.

This invention relates to an improved plant for the disposal of sewage; and it comprises a receiving-chamber having a porous floor and divided into several compartments, into one of which the sewer-pipe empties, a drying-chamber adjacent to the receiving-chamber and into which the sediment from the receiving-chamber is conducted, and suitable furnaces in the drying-chamber for drying the sediment and destroying the obnoxious gases. The plant is designed to continuously dispose of the matter discharged from sewer-pipes by first filtering the liquid from the solid material, permitting the former to escape in a clarified and unobnoxious state, while the latter is conducted into the drying-chamber and is there consumed. Air passage-ways are arranged to provide a continuous circulation of air through the receiving-chamber and drying-chamber and into the furnace, so that all odors and gases must pass into the furnace-chamber. The plant here shown is in some respects similar to the one illustrated in my Patent No. 672,614, dated April 23, 1901. The present invention comprises improvements in a plant of the same general description as the one shown in the said patent.

In the accompanying drawings, Figure 1 is a plan view of a plant constructed according to my present invention. Fig. 2 is a side elevation of the same. Fig. 3 is a front elevation. Fig. 4 is a rear elevation. Fig. 5 is a central section through the receiving and drying chambers, and Fig. 6 is a longitudinal section through the drying-chamber on the line 6 6 of Fig. 1.

Referring to the drawings, A indicates the receiving-chamber, and B the drying-chamber, both consisting of suitable brick inclosures separated a short distance from one another. The receiving-chamber is provided with a porous floor 1, raised above the base 2 of the chamber. This floor may be composed of brick or other suitable porous material. The chamber is divided into three compartments 3, 4, and 5 by partitions 6 and 7. The sewer-pipe 8 enters the chamber near the top of the settling-compartment 3, as shown, and delivers the sewage upon the porous floor within said compartment. A communicating opening 9 is formed between the compartments 3 and 4 in the partition 6, and a similar opening 10 is formed between the compartments 4 and 5 in the partition 7. The bottom of the opening 9 is arranged slightly below the mouth of the sewer-pipe, and the bottom of the opening 10 is arranged a little lower than the bottom of the opening 9, the arrangement being such that should the compartment 3 fill with liquid nearly to the sewer-pipe the liquid will flow into the compartment 4 and when the latter is filled nearly to the level of the liquid in the compartment 3 it will flow through the opening 10 into the compartment 5. Opposite the sewer-pipe a short distance above its lower edge is arranged an air-conduit 11, leading into the upper portion of the drying-chamber, and in the side walls of the compartment 5 are formed suitable air-inlet openings 12, the arrangement being such that air entering at the openings 12 will pass through the openings 10 and 9 and the conduit 11 into a drying-chamber, thus providing a circulation of air through the receiving-chamber and preventing the escape of gases therefrom to the atmosphere. These openings 12 extend slightly below the opening 10, so that in case the compartment 5 should become filled with liquid to the level of said openings it will flow outward, and thus prevent the chamber from becoming at any time filled to the level of the sewer-pipe.

In operation a large proportion of the liquid entering the settling-compartment 3 will filter through the floor of said compartment, while the sediment will be retained therein. As the porous floor in this compartment will in time become clogged, the water rising in the compartment 3 will flow into the compartment 4, but will not carry with it a very large percentage of sediment. In this latter compartment what sediment is carried over will settle, while a large part of the liquid will filter through the porous floor. Should this compartment become filled with liquid, the overflow will pass into the compartment 5, carrying practically no sediment. In the last-named compartment the liquid will in ordinary operation filter through the porous floor; but in case of a general clogging of the floor from an excessive flow of sewage or neglect in cleaning out the chamber the liquid will flow through the openings 12, which serve for the admission of air as well as for the outlet of fluid. Openings 13 are provided beneath the porous floor, through which air may circulate for the evaporation of water from the porous floor and also to permit the filtered water to pass out. The water after passing through the porous floor is comparatively clear and free from odors and may be conducted away and permitted to soak into the earth. A pipe or passage-way 14 is arranged between the compartmant 3 and the drying-chamber, said pipe being arranged at about the level of the floor of said compartment. This pipe is provided with a valve 15, which is normally closed. After the plant has been in operation for some time and a considerable amount of sediment has accumulated in the chambers 3 and 4 the flow of sewage through the sewer-pipe is stopped by closing the valve 8$^a$ and the valve 15 is opened, permitting the sediment to pass or be forced through the pipe 14 onto the porous floor 16 of the drying-chamber. The several compartments of the receiving-chamber are provided with suitable manholes 17 for convenience of access, and valve-controlled openings 18 are arranged in the lower parts of the partitions 6 and 7, through which any sediment which may accumulate in the chambers 4 and 5 may be shoveled into the chamber 3 and from thence through the pipe 14 into the drying-chamber. Access may be had to the space between the porous floor 1 and base 2 by means of a suitable door 18$^a$.

The drying-chamber, as shown in Figs. 5 and 6, is provided at one end with a small furnace 19 and at its opposite end with a larger furnace 20 and a stack 21 to create a suitable draft. The porous floor 16 is raised above the base, as in the receiving-chamber, in order to provide an air-circulated space beneath the floor. The pipe 14 enters the drying-chamber a short distance above the floor, and the air-conduit 11 enters the upper portion of the chamber. A communicating opening 22 between the drying-chamber and the furnace-chamber 20 is arranged a short distance above the porous floor in order that the air-currents within the receiving-chamber will pass close to the material which is to be dried on their way to the furnace. The larger furnace 20 and stack 21 are for the purpose of creating a draft and consuming the gases. From the furnace 19 heat is supplied for drying the material, and the gases from this furnace are drawn directly over the material into the larger furnace-chamber. The draft for the furnace 19 is supplied through the stacks or flues 25, which are provided with openings 26 below the grate of the furnace 19. The draft created by the larger furnace 20 draws air through the flues 25 to the smaller furnace 19. Ordinarily the entire plant will be inclosed by a housing 27, as indicated in Fig. 4, to prevent freezing in cold weather, and any gases escaping within the housing will be drawn down through the flues 25 and consumed.

It will be understood that it is only occasionally necessary to move the sediment from the receiving-chamber into the drying-chamber, and it is therefore unnecessary to constantly maintain fires in both furnaces. It is only for the purpose of quickly drying the material that the two furnaces are employed. At other times it is preferable to keep sufficient fire in the larger furnace only in order to create a draft and consume the gases. Openings 24 are provided for the purpose of permitting air to circulate beneath the porous floor 16 for the purpose of evaporating any water which may filter through said floor when material is first brought into the drying-chamber.

It will be seen that in this plant there can be no passage of gases to the atmosphere except through the stack and that as the filtering-chamber is divided into several compartments arranged in a series the filtering operation will be greatly facilitated. While I have shown three such compartments, it will be apparent that other compartments might be added, if desirable; but in practice I have found three to be enough, as the liquid upon reaching the third compartment does not contain sufficient sediment to clog the porous floor.

Having described my invention, what I claim, and desire to secure by Letters Patent, is—

1. In a plant for the disposal of sewage a receiving-chamber having a porous floor and divided by suitable partitions into a settling-compartment and one or more adjoining compartments, a sewer-pipe entering the upper portion of said settling-compartment, openings in the upper portions of said partitions arranged so that the liquid will flow into and fill said adjoining compartments in succession, air-inlet openings in the receiving-chamber, a drying-chamber, a valve-controlled passage-way leading from the bottom of the settling-compartment to the drying-chamber, a furnace-chamber, and an air passage-way leading from the upper portion of the receiving-chamber to the furnace-chamber.

2. In a plant for the disposal of sewage a receiving-chamber having a porous floor, suitable partitions separating said chamber into several compartments, communicating openings between said compartments in the upper portions of said partitions, a sewer-pipe entering a settling-compartment at one end of the chamber, air-inlet openings entering a compartment at the opposite end of the chamber, a drying-chamber adjacent to said receiving-chamber, a valve-controlled passage-way leading from the bottom of the settling-compartment to the drying-chamber, an air passage-way leading from the upper portion of the settling-compartment to the drying-chamber, and means for maintaining a draft from the air-inlets in the receiving-chamber through the several compartments and said air passage-way into the drying-chamber.

3. In a plant for the disposal of sewage a receiving-chamber having a porous floor and a plurality of compartments one of said compartments being a settling-compartment and having a sewer-inlet in its upper portion, a communicating passage-way between said settling-compartment and the adjoining compartments, a drying-chamber, a valve-controlled passage-way leading from the bottom of said settling-compartment to said drying-chamber, an air passage-way leading from the upper portion of the receiving-compartment to the drying-chamber, air-inlets in the receiving-chamber, and means for creating a draft from the receiving-chamber into and through the drying-chamber.

4. In a plant for the disposal of sewage a receiving-chamber having a porous floor and divided by a series of partitions into a settling-compartment and several adjoining compartments, a sewer-pipe opening into the upper portion of said receiving-compartment, openings through said partitions, said openings being lower than the sewer-pipe and the opening in each partition in the series being lower than the opening in the preceding partition, air-inlets in the last compartment in the series, a drying-chamber, an air passage-way leading from the upper portion of the settling-compartment to said drying-chamber, a valve-controlled passage-way leading from the bottom of the settling-compartment to the drying-chamber and means for maintaining a draft through said receiving-chamber and drying-chamber.

5. In a plant for the disposal of sewage a receiving-chamber having a porous floor and several compartments one of which is a settling-compartment, a sewer-pipe entering the upper portion of said settling-compartment, air-inlets in said receiving-chamber, a drying-chamber, a valve-controlled passage-way leading from the bottom of said settling-compartment to the drying-chamber, an air passage-way leading from the upper portion of said receiving-chamber into the drying-chamber and a furnace arranged to create a draft through said receiving and drying chambers.

6. In a plant for the disposal of sewage a receiving-chamber having a porous floor and several compartments one of which is a settling-compartment, a sewer-pipe entering the upper portion of said settling-compartment, air-inlets in said receiving-chamber, a drying-chamber, a valve-controlled passage-way leading from the bottom of said settling-compartment to the drying-chamber, an air passage-way leading from the upper portion of said settling-compartment into the drying-chamber, a furnace arranged at one end of said drying-chamber for the purpose of creating a draft, and a furnace arranged at the opposite end of said drying-chamber for the purpose of drying the sediment.

7. In a plant for the disposal of sewage a receiving-chamber having a porous floor and several compartments, one of which is a settling-compartment, a sewer-pipe entering the upper portion of said settling-compartment, air-inlets in said receiving-chamber, a drying-chamber having a porous floor, a valve-controlled passage-way leading from the bottom of said settling-compartment to the drying-chamber, an air passage-way leading from the upper portion of said receiving-chamber into the drying-chamber and a furnace arranged to create a draft through said receiving and drying chambers.

8. In a plant for the disposal of sewage a receiving-chamber having a porous floor and several compartments one of which is a settling-compartment, a sewer-pipe entering the upper portion of said settling-compartment, air-inlets in said receiving-chamber, a drying-chamber, a valve-controlled passage-way leading from the bottom of said settling-compartment to the drying-chamber, an air passage-way leading from the upper portion of said settling-compartment into the drying-chamber, a furnace arranged at one end of said drying-chamber for the purpose of creating a draft, a furnace arranged at the opposite end of said drying-chamber for the purpose of drying the sediment, a down-draft-flue leading to said latter furnace, and an inclosure surrounding said plant.

In testimony whereof I affix my signature in presence of two witnesses.

JOSEPH DANNER.

Witnesses:
WILLIAM A. GEIGER,
ALBERT HEIER.